F. J. CHARY.
ELASTIC TIRE FOR WHEELS.
APPLICATION FILED JAN. 13, 1906.
898,832.
Patented Sept. 15, 1908.
2 SHEETS—SHEET 1.
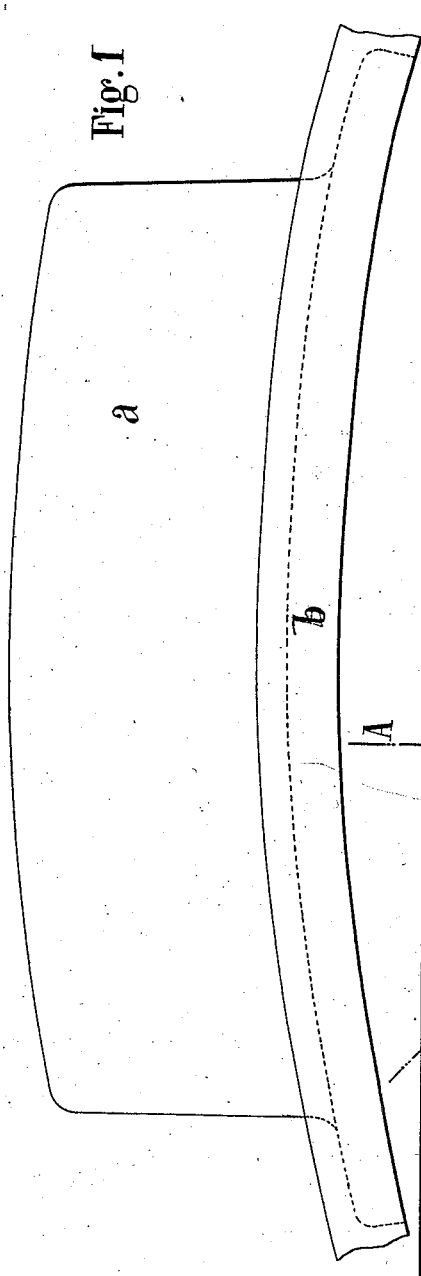
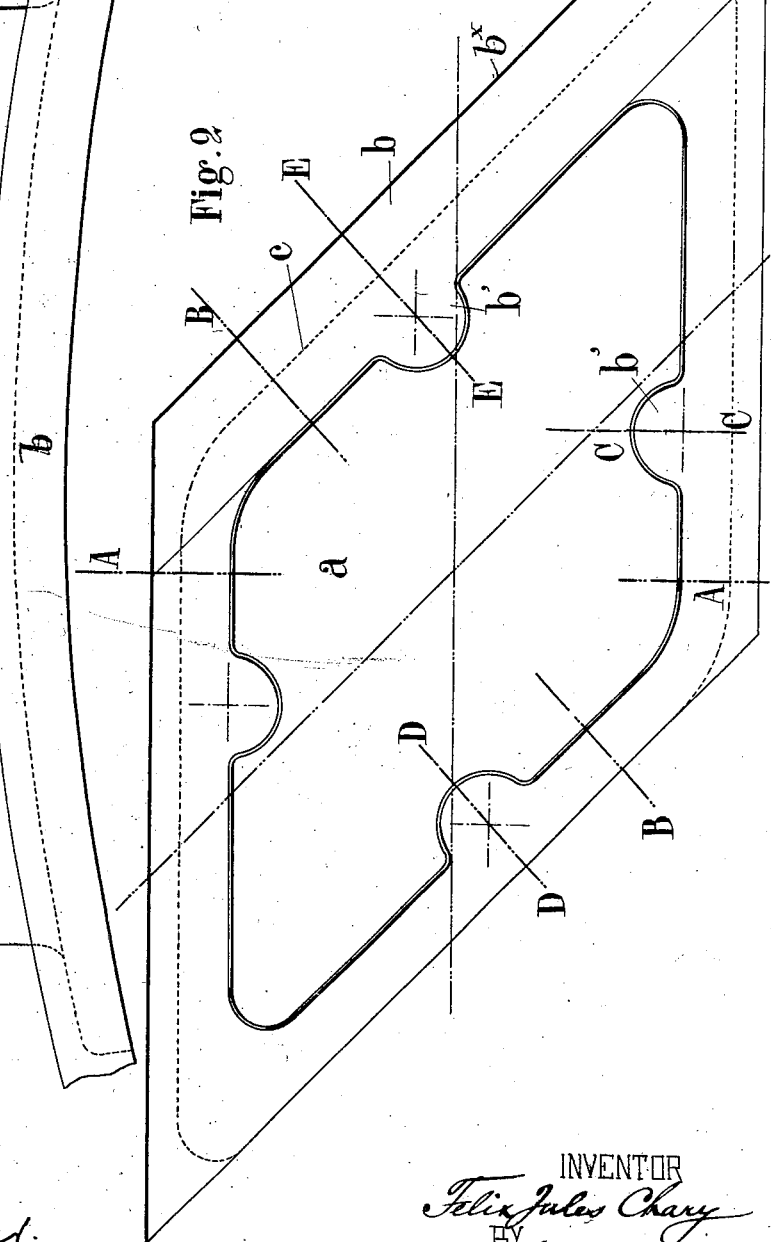
WITNESSES
INVENTOR
Felix Jules Chary
BY
ATTORNEYS

F. J. CHARY.
ELASTIC TIRE FOR WHEELS.
APPLICATION FILED JAN. 13, 1906.

898,832.

Patented Sept. 15, 1908.
2 SHEETS—SHEET 2.

WITNESSES:

INVENTOR
Felix Jules Chary
BY
ATTORNEYS.

UNITED STATES PATENT OFFICE.

FELIX JULES CHARY, OF PARIS, FRANCE.

ELASTIC TIRE FOR WHEELS.

No. 898,832.

Specification of Letters Patent.

Patented Sept. 15, 1908.

Application filed January 13, 1906. Serial No. 295,920.

*To all whom it may concern:*

Be it known that I, FELIX JULES CHARY, a citizen of the Republic of France, and resident of Paris, France, have invented a new and useful Improvement in or Relating to Elastic Tires for Vehicles, which improvement is fully set forth in the following specification.

Elastic tires for vehicle wheels have already been produced, comprising a series of rubber blocks of rectangular shape secured to the rim by means of metal frames. These blocks, arranged longitudinally one after another, are non-continuous or present between them spaces which produce strong vibrations which injuriously affect all the parts of the car.

This invention relates to a construction of an elastic tire which obviates the above drawback. Therefore a construction has been designed in which are used blocks in the shape of a parallelogram, secured to the rim, and arranged diagonally relatively to the wheel. In this way the arrangement of the blocks enables one block to begin to act while the preceding one is still in contact with the ground, so that the same advantages are obtained as with a tire with double series of elements, or with a continuous tire. Moreover, the drawbacks of the continuous tire, more particularly heating, are avoided, and repairs can be effected block by block.

In order to render the description as clear as possible, a construction of the elastic tire according to this invention is illustrated, by way of example, in the accompanying drawing.

Figure 5:
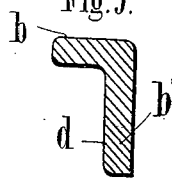
Figure 3:
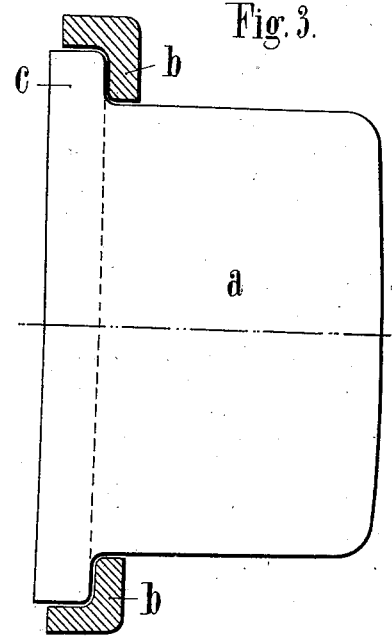
Figure 8:
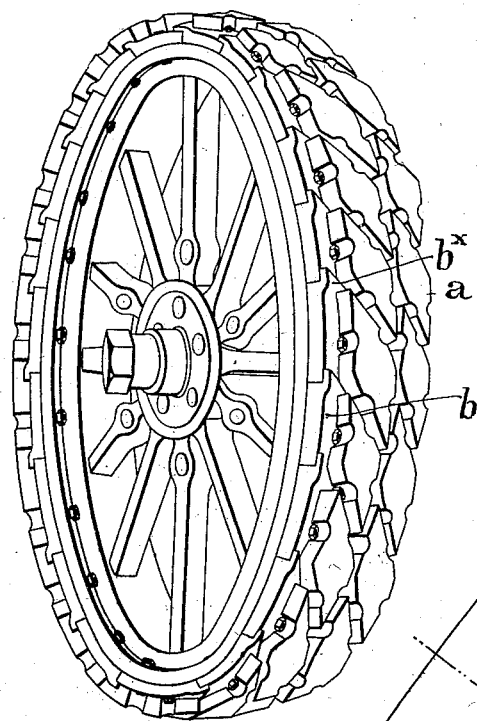
Figures 4, 6, 7:
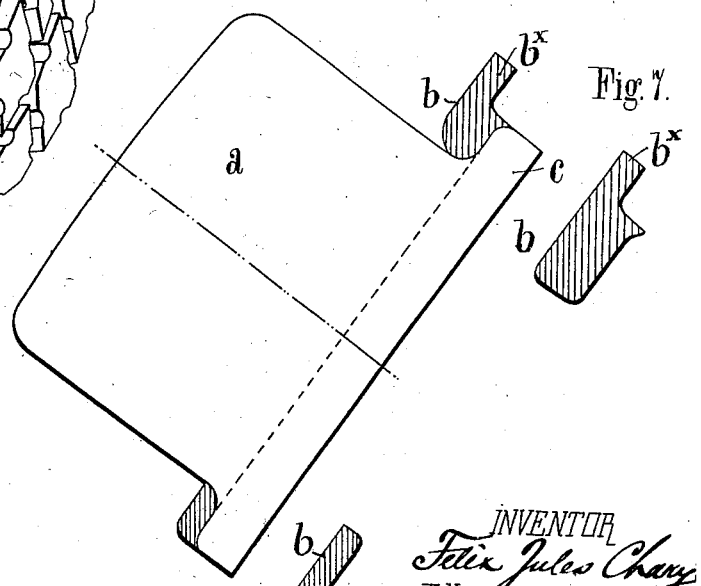

Figure 1 is an elevation of a block or element of a tire, Fig. 2 is a plan of the frame $b$. Figs. 3 and 4 are sections of the block shown in Fig. 1, on the lines A A and B B of Fig. 2, Figs. 5, 6 and 7 are cross-sections of the frame on the lines C C D D and E E of Fig. 2, Fig. 8 is a perspective view of a wheel with a tire with a double series of staggered or overlapping elements.

The block $a$ (Figs. 1, 3 and 4) of the shape already described, is secured to the rim by means of a metal frame $b$, the recessed portion of which has the exact shape of the block. The block itself is provided with a projecting flange $c$ which engages with a groove $d$ provided on all four under sides of the frame $b$. In order to fit up these elements, an iron rim is mounted on the wooden rim. Then the frames $b$ being provided with a number of holes corresponding to the holes made in the iron rim, each element can be secured by means of bolts passing through the said holes. It will be understood that under these conditions each block is secured in a perfect manner, the portion of the rubber secured under the frame being sufficient to prevent the block from escaping or being wrenched out. However, by way of precaution, when it is a question of square or rectangular blocks for arrangement in double series, or of blocks in the shape of a parallelogram arranged diagonally in a single series, each frame is provided with inwardly projecting tongues or projections $b'$ which engage with the block in the manner shown in Fig. 2, their object being to properly maintain the block in its place in the frame, which might have the tendency of becoming crushed in the portion of the frame opposite to the direction of travel of the vehicle. The fixing bolts are preferably arranged at the point of these tongues or projections as shown in Fig. 8.

As shown in Figs. 2 and 3, the sides of the frame $b$ which are parallel to the sides of the wheel are provided with downwardly-turned flanges which inclose the flange $c$ of the block at its outer edge. Fig. 4 shows that the other sides of the frame are not provided with these downwardly-turned flanges, but one of these sides is provided with a lateral flange $b^\times$ which is adapted to fit over the frame of the adjacent block, as shown in Fig. 8. Fig. 6 shows the side of the frame which fits under the flange $b^\times$ of the adjacent frame, the form of said flange being indicated in Fig. 7 as well as Fig. 4.

Having thus described my invention, I claim:

In a tire for vehicle-wheels, the combination, with the rim, of a plurality of frames of parallelogrammic form secured in said rim independently of each other, each frame having a groove at its under part on all sides and inwardly-projecting tongues intermediately of the length of all of the sides, and tread-blocks secured within said frames by means of base-flanges which extend beneath said tongues and into said grooves, the grooves or spaces between adjacent blocks extending obliquely of the tread-surface.

In testimony whereof I have signed this specification in the presence of two subscribing witnesses.

FELIX JULES CHARY.

Witnesses:
 EMILE LEDRET,
 HANSON C. COXE.